United States Patent [19]
Lynch et al.

[11] 3,900,839
[45] Aug. 19, 1975

[54] APPARATUS AND METHOD FOR MEASURING SPEED OF SOUND IN LIQUID

[75] Inventors: Thomas H. Lynch, Canoga Park; Hudson T. Patten, III, Santa Susana, both of Calif.

[73] Assignee: The Bunker-Ramo Corporation, Oak Brook, Ill.

[22] Filed: Feb. 8, 1974

[21] Appl. No.: 440,913

Related U.S. Application Data

[60] Continuation of Ser. No. 242,261, April 7, 1972, which is a continuation of Ser. No. 10,686, Jan. 22, 1970, which is a division of Ser. No. 776,998, Nov. 19, 1968, Pat. No. 3,522,580.

[52] U.S. Cl. ................ 340/203; 340/6 R; 340/210
[51] Int. Cl.² ................... G08C 19/16; G01V 1/00
[58] Field of Search ................................. 340/210

Primary Examiner—Thomas B. Habecker
Attorney, Agent, or Firm—F. M. Arbuckle; Arthur Freilich

[57] ABSTRACT

Apparatus and method are disclosed for measuring the speed of sound in water and other liquids with an accuracy in the order of ±1/50,000 by using a single transducer and a reflecting target in an arrangement that detects the zero-crossover at the end of the first full cycle of the second reflected signal, and actuates the transducer at that time for retransmission of the acoustic signal. A standing wave produced by this method allows the input dynamic range to be in excess of 12 db. Operation of the apparatus is monitored through the power supply cable by momentarily shunting one of two resistors connected in series therewith in response to each retransmission. This monitoring technique allows the monitoring instruments to remain on the surface of the liquid with the power supply and one of the two resistors. A tunnel-diode threshold detector improves stability of operation over a wide range of temperatures.

3 Claims, 4 Drawing Figures

INVENTORS
HUDSON T. PATTEN III
THOMAS H. LYNCH

ATTORNEYS

APPARATUS AND METHOD FOR MEASURING SPEED OF SOUND IN LIQUID

This is a continuation of application Ser. No. 242,261, filed in Apr. 7, 1972 which itself is a continuation of application Ser. No. 10,686, filed Jan. 22, 1970, which in turn is a division of application Ser. No. 776,998, filed Nov. 19, 1968, now U.S. Pat. No. 3,522,580.

BACKGROUND OF THE INVENTION

This invention relates to apparatus and method for measuring the speed of sound in water and other liquids, and particularly to such apparatus for use in oceanography.

In oceanography, it is often desirable to measure the speed of sound at various depths. An instrument designed for that purpose, often referred to as a velocimeter, is usually based on the principle of transmitting a sound wave to a target at a known distance and effectively measuring the time required for the sound wave to reach the target or to be reflected by the target and return to the point of transmission. This principle has in the past been implemented in a straightforward manner using piezoelectric devices for the transducers to both transmit and receive the sound wave. The target is provided as part of the instrument and spaced a predetermined minimum distance from the transmitting transducer. The speed of sound is then determined by the frequency of retransmission, which is proportional to transmission time divided by the length of the total sound path.

Although accuracies in the order of plus or minus one part in 10,000 have been achieved by this straightforward implementation of the principle using a single transducer and a reflecting target, there is a need for greater accuracy in the order of plus or minus one part in 50,000. To achieve such accuracies, the instrument design must take into consideration both pressure and temperature variations which affect primarily the mechanical design features, as more fully discussed in U.S. Pat. No. 3,482,647 issued Dec. 9, 1969 filed concurrently herewith and assigned to the assignee of the present invention. However, some consideration must also be given to pressure and temperature variations in the design of the electronic portion of a velocimeter. It is not sufficient to select pressure and temperature insensitive components for the electronic portion of the instrument; some consideration should also be given to the system organization, i.e., to the arrangement of functional circuits for transmitting the acoustical signal and precisely determining the front of the return signal. Here again, it is not sufficient to select a transducer for transmitting a sound wave with a steep front of high amplitude, since the wavefront will deteriorate in its transmission to and from the target. Once the optimum system organization has been devised, circuits must be selected or designed to carry out the various functions of the system without degrading the operating characteristics of the system.

Most velocimeters have an input acoustic dynamic range for a specified accuracy of 3 db or less. It would be desirable to have a velocimeter with an input acoustic dynamic range in excess of 12 db.

SUMMARY OF THE INVENTION

Accuracies on the order of plus or minus one part in 50,000 have been achieved with a dynamic input range in excess of 12 db by using a double-folded soundpath in which a standing wave resulting from the second reflected signal is used for measuring transmission time. This improved system organization then effectively employs zero-crossover detection of the second reflected signal. Zero-crossover detection is employed to trigger transmission of another acoustic signal, as in other instruments employing a reflecting target, but by using a double-folded soundpath and effectively triggering the next transmission at the end of the first full cycle of the reflected signal, the input dynamic range is significantly improved to more than 12 db. This is because the double-folded soundpath allows wavefronts to combine such that the summational waveform for the first full cycle of the second reflected signal has a higher peak amplitude and therefore greater dynamic range. In addition, the slope of the summational waveform is greater at zero-crossover than if a single-folded soundpath were used.

This double return method of measuring the speed of sound in water is achieved by employing internal timing means to effectively disable the zero-crossover detector for the period of the first return signal from the target, and thereafter employing a threshold detector to detect the first part of the second half of the first cycle of the second return signal to enable the zero-crossover detector to respond to the zero-crossover at the end of that first cycle. In that manner, the zero-crossover detector triggers the retransmission of the acoustic signal upon receipt of the second return signal only. The threshold detector is inhibited by the internal timing means during the first return of the reflected signal. At a time substantially after the first return signal is received, but well before the second return signal is expected, the internal timing means removes the inhibiting signal from the threshold detector to allow it to enable the zero-crossover detector when the second return signal is received. Once it is received and its zero-crossover is detected, the internal timing means is reset at substantially the same instant the sound transducer is triggered to transmit the next acoustic signal, thereby initiating another double return cycle.

The components selected for the electronic circuits are preferably pressure-insensitive. Accordingly, all active elements are selected to be solid-state devices, and the capacitors are selected to be of suitable design in appropriately sealed containers to withstand pressures of up to 20,000 psi without variation. The timing means, threshold detector, and other circuits may employ junction transistors since their operation is not so critical, but in the crossover detector, the voltage of the base-emitter junction ($V_{be}$) of a transistor varies too greatly for the accuracies desired. Accordingly, the threshold detector employs a tunnel diode so biased as to be triggered on when the input signal coupled thereto crosses the zero-reference voltage.

In accordance with a further feature of the present invention, the same tranducer employed for both transmission and reception of sound waves is effectively decoupled from the electronic timing system. That is accomplished by an input-output decoupling circuit comprising a series-connected diode forward-biased for receiving a reflected signal and a second diode, shunting the output of the first diode to ground, so poled as to be normally back-biased. When the transducer is triggered for transmission of a sound wave, a capacitor couples a sufficiently large signal to the first diode to back-bias it, thereby blocking transmission of the input signal to the system. At the same time, the second diode is forward-biased to shunt the input of the system (the output of the first diode) to ground. In that manner, the transducer connected to the system input terminal through the decoupling network is substantially reduced from about 10 volts to about 1.6 volts, the latter being the difference between the quiescent forward-bias of the first diode and the resulting forward-bias of the second diode during transmission.

The embodiment of the invention specifically disclosed herein comprises an astable multivibrator as the timing means. Since it is reset by the second return signal from the target, its period under normal operation is not its free-running period but rather some shorter period which is proportionate to the speed of sound. Accordingly, to monitor the instrument, an output cable is connected to the astable multivibrator.

In accordance with still another feature of the present invention, the power supply for the electronic circuits is not included in the instrument package. Instead, power is supplied from the surface of the water through a cable. For stable operation of the circuits, particularly the zero-crossover detector, a voltage regulator is then provided in the instrument package. The power supply cable is then used as the output cable. In order to use the power supply cable to monitor the instrument by observing the operation of the timing means, two resistors are connected in series with the internal conductor of the power supply cable, one resistor in the instrument package and the other near the power supply source on the surface of the water. A shunt switch is then connected in parallel with the resistor in the instrument package, and so operatively connected to the timing means as to shunt the resistor cyclically in response to operation of the internal timing means. In that manner, a voltage signal is produced on the input power cable between the two resistors so that a monitoring instrument, such as an oscilloscope, may be connected to the power cable between the resistors at a point near the power supply on the surface of the water.

The novel features of the invention are set forth with particularity in the appended claims. The invention will best be understood from the following description when read in conjunction with the accompanying drawings.

DESCRIPTION OF THE PREFERRED EMBODIMENT

Figure 1:
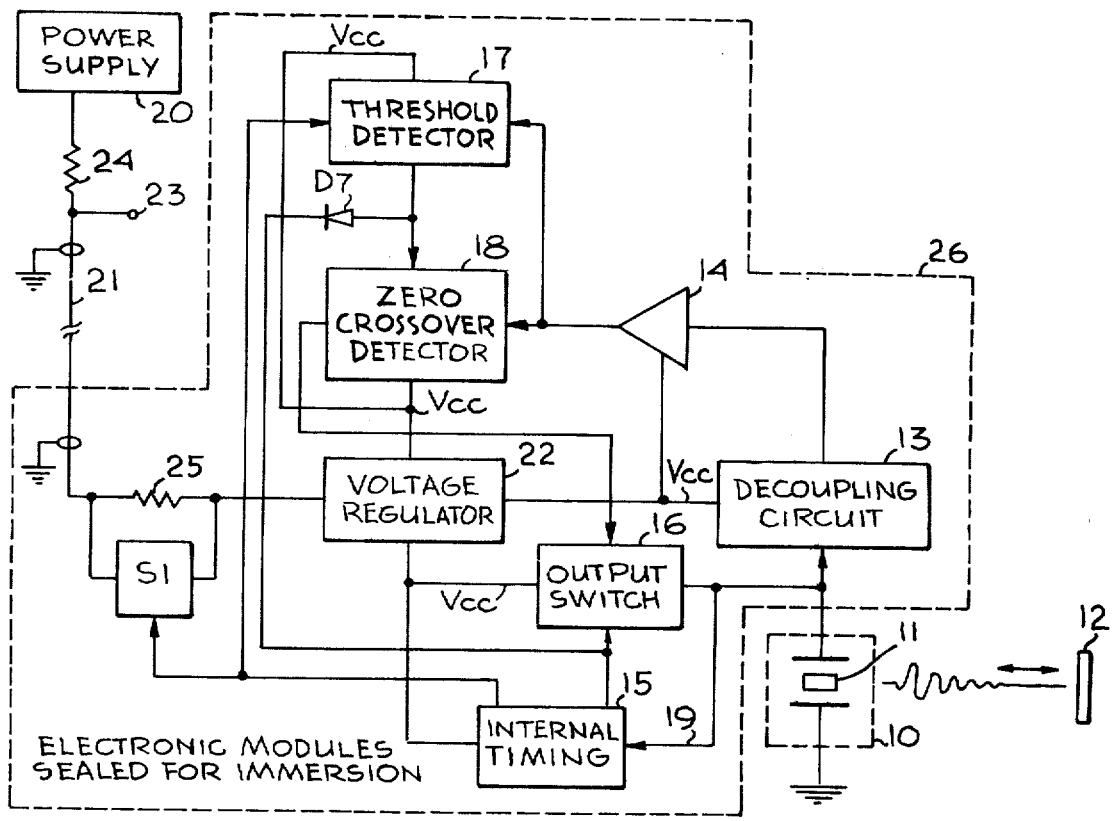
FIG. 1 is a block diagram schematically illustrating an instrument for measuring the speed of sound in water in accordance with the present invention.

The preferred embodiment illustrated in FIG. 1 in block diagram form employs the basic velocimeter principle using a single transducer and a reflecting target and involves electrically stimulating a transducer 10 (commonly referred to as a hydrophone) employing a piezoelectric device 11 to convert a step voltage signal to mechanical motion, thereby transmitting an acoustic signal through water to a target 12.

The target 12 is designed to reflect the acoustic signal directly back to the transducer 10, where the received wavefront causes the device 11 to produce an electrical signal. The electrical signal produced by the reflected acoustic signal is transmitted by an input-output decoupling circuit 13 to an amplifier 14. In the usual velocimeter, the signal thus received by the amplifier 14 is employed to retransmit another acoustic signal through the transducer 10. The speed of sound is then proportional to the frequency with which the transducer 10 is caused to transmit acoustic signals. However, in accordance with the present invention, only every other reflected signal is employed to trigger the transducer for retransmission of another acoustic signal. That is accomplished by internal timing means 15 controlling an output switch 16 and inhibiting a threshold detector 17.

The timing means 15 is preferably an astable multivibrator which, together with the output switch 16, provides a self-starting mode of operation. Thereafter, the threshold detector 17 and a zero-crossover detector 18 are employed to provide a speed-measuring mode of operation.

In the self-starting mode of operation, the internal timing means 15 produces a squarewave, the leading edge of which is transmitted through the output switch 16 to actuate the transducer 10. If reflected signals were not received from the target 12, the internal timing means 15 would repeatedly actuate the transducer 10 at the free-running frequency of the internal timing means 15. The basic repetition frequency established by the internal timing means 15 is selected to be approximately 5KHz for a total soundpath of 20 centimeters. Since the acoustic signal is to be reflected from the target 12 twice before the transducer 10 is reactuated, the distance of the transducer 10 from the target 12 is only 5 centimeters and the soundpath for the first reflected signal is only 10 centimeters. Accordingly, the period for the first reflected signal is in the order of 67 to 70 microseconds, a period less than half the period of the timing means 15 operating at 5KHz. Therefore, the timing means 15 will not reactuate the transducer 10 until after the period of the expected second reflection from the target 12. In the meantime, the second reflected signal received reactuates the transducer 10 and recycles (resets) the internal timing means 15 over a line 19. Thus, once the internal timing means 15 actuates the transducer 10 in the self-starting mode, reflected signals from the target 12 will reset the internal timing means, thereby changing the period of its output signal and converting the system to the speed measuring mode of operation.

The first reflected signal from the target 12 coupled to the amplifier 14 will not be effective to actuate the output switch 16 and cause the transducer 10 to retransmit an acoustic signal because the zero-crossover detector 18 is disabled by the threshold detector 17, and operation of the threshold detector 17 is inhibited by the internal timing means 15. However, before the second reflected signal is received by the amplifier 14, the natural half period of the internal timing means 15 will have expired so that the threshold detector 17 is no longer inhibited. The threshold detector 17 then detects the presence of the second half of the first full cycle of the second reflected signal, and in response thereto enables the zero-crossover detector 18 to detect the end of the first full cycle of the second reflected signal. The zero-crossover detector 18 actuates the output switch 16 to reset the internal timing means 15 and cause the transducer 10 to retransmit an acoustic signal. When the internal timing means 15 is reset, the threshold detector 17 is reset and again disabled. To expedite inhibiting the zero-crossover detector again, a diode $D_7$ is provided to couple the internal timing means 15 directly to the inhibiting terminal of the zero-crossover detector 18. Thereafter, the threshold detector 17 inhibits the zero-crossover detector 18 as just described.

A power source 20 is connected to the electronic circuits 13 through 17 by a coaxial cable 21. A voltage regulator 22, which provides a stabilized voltage source for all functional circuits of the system, allows the power cable 21 to be used to monitor operation of the internal timing means 15 with, for example, an oscilloscope connected to an output terminal 23 near the power supply 20 on the surface of the water while the circuits 13 through 18 and the voltage regulator 22 are immersed in the water with the transducer 10.

To employ the power cable 21 to monitor the internal timing means 15, an output signal coupler is provided between the cable 21 and the internal timing means 15. That coupler comprises two resistors 24 and 25 connected in series with the power cable 21, with the first resistor 24 between the power supply 20 and the output terminal 23, and the second resistor 25 near the voltage regulator 22 in the immersed instrument. A switch $S_1$ connected in parallel with the resistor 25 is controlled by the internal timing means 15 such that the inhibiting signal to the threshold detector (or its complement) actuates the switch $S_1$ to periodically shunt the resistor 25, thereby providing an output voltage signal at the terminal 23 with a period directly controlled by the internal timing means 15, which in turn is recycled at a frequency proportionate to the speed of sound in the water. The resistors 24 and 25 are selected to minimize power loss. Thus a single properly terminated coaxial cable may be employed both to couple power to the electronic circuits of the instrument and to couple a system output signal terminal 23. It should be understood, of course, that the electronic circuits are enclosed in a waterproof container represented in FIG. 1 by a dotted line 26, but neither the pressure nor temperature of the container need be regulated. The coaxial cable is then also waterproof and suitably connected to the container to maintain a watertight seal for both the cable and the container.

Figure 2:
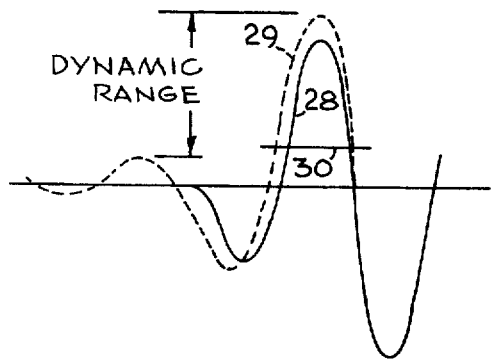
FIG. 2 is a waveform diagram illustrating the manner in which the present invention provides a greatly improved acoustic dynamic range.

The advantage of triggering the transducer 10 on the zero-crossover at the end of the full cycle of the second return acoustic signal, instead of some part of the first return acoustic signal, will now be described with reference to FIG. 2. The solid line waveform 28 represents a single second return acoustic signal which would produce a corresponding electrical signal at the output of the amplifier 14 were it not for the double reflecting mode of operation which creates a standing wave in the soundpath of the form represented by the dotted line 29. This is because one full cycle of the second return acoustic signal will be reflected from the transducer 10 before the next pulse from the output switch 16. The standing wave 29 will have a positive half cycle that precedes the first positive half cycle (second half of the first full cycle) of the second return signal 28. Accordingly, to avoid detecting the first positive half of the standing wave 29 and triggering the transducer 10 through the output switch 16 by detection of the zero-crossover at the end of that positive half cycle, the zero-crossover detector 18 is disabled by the threshold detector 17. The threshold detector 17 is then biased to trigger at a level 30 which is above the peak amplitude of the first positive half cycle of the standing wave 29. Thus, once the threshold detector 17 has detected the following positive half cycle of greater amplitude, the zero-crossover detector 18 is enabled. Thereafter, at the point where the standing wave crosses the zero reference, the detector 18 triggers the transducer 10 through the output switch 16 to retransmit an acoustic signal.

The cycle is repeated only on alternate return acoustic signals due to the internal timing means 15 inhibiting the threshold detector 17 for a period following the retransmission of an acoustic signal greater than the expected time of the first return acoustic signal, but less than the earliest time of the second return acoustic signal. The acoustic dynamic range of the system is then the difference between the peak of the first positive half cycle and the peak of the second positive half cycle. This is in excess of 12 db. Thus, the result of triggering the retransmission of an acoustic signal with the zero-crossover at the end of the first full cycle of the second return signal maximizes the available acoustic dynamic range. It should be noted that zero-crossover detection is also improved because of the greater slope of the standing wave 29.

To utilize the full acoustic dynamic range, the threshold detector 17 must be set to just above the peak amplitude of the first positive half cycle of the standing wave 29. Then the second positive half cycle can decrease almost 12 db and still allow threshold detection on only that half cycle. In practice, however, the threshold detector is set at a higher level 30 to prevent accidental triggering on the wrong half cycle. The exact threshold level 30 is adjusted by setting the threshold detector 17 at a predetermined level and then adjusting the gain of the amplifier 14, instead of setting the gain of the amplifier and adjusting the threshold level.

The amplifier 14 is designed to be sufficiently stable for a system accuracy of plus or minus one part in 50,000.

To accomplish that, the phase shift stability should be on the order of plus or minus one nanosecond, which will result in an accuracy degradation of less than plus or minus one part in 150,000. Such stability may be achieved with state-of-the-art components, such as NPN silicon transistors. To minimize phase shift and maximize gain, d-c collector feedback is used with no resistive coupling between stages. Instead, like stages are capacitively coupled in cascade. For example, the amplifier 14 may comprise two voltage amplifier stages connected in cascade, each stage comprising an NPN transistor in a common emitter configuration. The output of the second stage is then suitably coupled to the zero-crossover detector 18 and the threshold detector 17.

Figure 3:
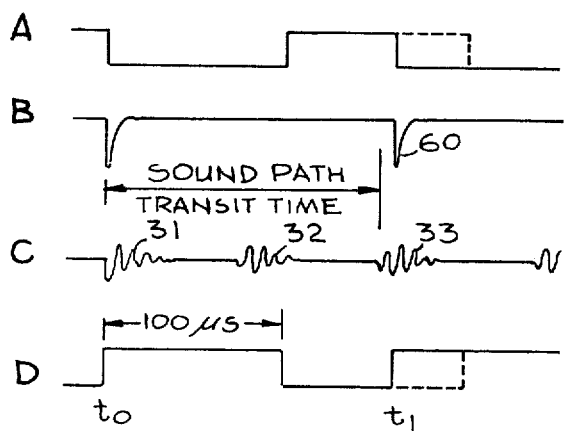
FIG. 3 is a timing diagram illustrating the operation of the present invention.

The timing diagram of FIG. 3 summarizes the system operation. Waveform A is the output of the internal timing means 15 transmitted to the output switch 16. At time $t_0$, the negative step of the first half cycle of the waveform A triggers the output switch to produce a 10 volt pulse across the piezoelectric device 11 as shown in waveform B. The acoustic wave produced is shown as signal 31 of waveform C. The first return of the acoustic signal is received by a piezoelectric device 11 about 67 to 70 microseconds later, as represented by signal 32 of waveform C.

The complement of waveform A shown in waveform D is applied to the threshold detector 17 to disable it until the waveform D again returns to zero 100 microseconds after transmission of the acoustic signal, which is about 30 to 33 microseconds after the first return of the acoustic signal. Accordingly, the threshold detector 17 ignores the first return signal 32 and disables the zero-crossover detector 18. By the time the second return of the acoustic signal (signal 33 in waveform D) is received, the waveform D will have returned to zero so that the threshold detector 17 detects the second half (positive half) of the first full cycle and enables the zero-crossover detector 18 to trigger the output switch 16 at the end of the first cycle of the second return signal. In that manner, the device 11 is again actuated to retransmit the acoustic signal. If a second return signal had not been received, the timing means 15 would have completed its full cycle so that the waveform A would have again become zero volts 200 microseconds after the first transmission. The negative step shown in dotted lines of the second cycle would then have triggered the output switch 16 to cause the device 11 to retransmit the acoustic signal.

It should be noted that in determining speed of sound by dividing the total path length of approximately 20 centimeters by the time difference ($t_1-t_0$) between successive transmissions of acoustic signals, a slight error would occur if the first two transmissions were selected as shown in FIG. 3 for the reason that the retransmission occurs at the end of the first full cycle of the second return acoustic signal. However, thereafter retransmission occurs at the same point in time relative to the second return signal so that the time difference between successive retransmissions will provide a precise measure of speed to an accuracy of plus or minus one part in 50,000.

To monitor the operation of the instrument, either waveform A or waveform D may be employed. The waveform D is selected for convenience. The waveform D is also selected for disabling the threshold detector 17 during the first half cycle of the internal timing means 15 for convenience. These conveniences of circuit design should not be construed as limitations upon the invention as disclosed in FIG. 1. For instance, both the switch $S_1$ and the threshold detector 17 could be designed to operate as described in response to the waveform A.

Designs of preferred circuits will now be described with reference to FIG. 4. The internal timing means 15 is an astable multivibrator comprising transistors $Q_1$ and $Q_2$ cross-coupled by diodes $D_1$ and $D_2$ in series with respective capacitors 41 and 42. The collector of the transistor $Q_2$ is connected to the threshold detector 17 and the switch $S_1$; accordingly, the output of the transistor $Q_2$ is the waveform D shown in FIG. 3. The output of transistor $Q_1$ is connected to the output switch 16 by a coupling diode $D_3$ to trigger the device 11 in response to only the first negative step of the waveform A in FIG. 3.

The output switch 16 comprises a pair of PNP transistors $Q_3$ and $Q_4$, which are biased to be normally nonconductive. The base of the transistor $Q_4$ is coupled to the coupling diode $D_3$ by a capacitor 43 which, together with a resistor 44, differentiates the negative step voltage of the waveform D in FIG. 3 to provide a sharp negative pulse that is RC coupled to the base of an NPN transistor $Q_5$ by resistor 58 and capacitor 59. The transistor $Q_5$ is driven to saturation to provide a negative pulse across the device 11 as shown in the waveform B. A capacitor 45 which couples the output switch 16 to the piezoelectric device 11 is much larger than the capacitance of the piezoelectric device 11 so that a stored charge across plates of the piezoelectric device 11 is quickly discharged when the transistor $Q_5$ is turned on. The result may be, for example, a $-10$v. pulse across the device 11.

The device 11 is also connected to the amplifier 14 so that when the output switch 16 is triggered, a large negative pulse is also transmitted to the amplifier 14. To prevent such a large signal from reaching the amplifier 14, which is designed to receive only 25 multivolt signals from the device 11 in response to reflected acoustic signals, the decoupling circuit 13 is provided. It consists of a diode $D_4$ forward-biased by resistors 46 and 47. In a quiescent or steady-state condition, the diode $D_4$ will be conducting current through the resistors 46 and 47. The voltage drop across the resistor 47 is selected to be about 1 volt, and the dynamic impedance of the diode $D_4$ will be approximately 12 ohms because of the bias current. A diode $D_5$ connected in parallel with the resistor 47 will thus be normally backbiased so that the reflected signal from the piezoelectric device 11 will be coupled to the input stage of the amplifier 24. However, when the output switch 16 is triggered, and the capacitor 48 couples a large negative pulse from the output switch to the diode $D_4$, the diode $D_4$ will become back-biased and the voltage across the diode $D_5$ will drop from $+1$v. to approximately $<0.6$v. In that manner, the amplifier 14 will be subject to only a 1.6v. negative excursion, and not the full $-10$v. excursion of the pulse from the output switch 16.

A resistor 49 connects a junction between the transducer 11 and the coupling capacitor 48 to the regulated voltage source ($+Vcc$) in order that capacitance of the transducer 11 may not be charged beyond that level.

As noted hereinbefore, the amplifier consists of two cascaded stages, each comprising an NPN transistor in common emitter configuration. Since the input transistor has a $V_{be}$ rating of $-2$v., this decoupling circuit 13 provides adequate protection for the amplifier 14 at the end of the transmission, the capacitors 45 and 48 will recharge to allow the diode $D_4$ to again be forward-biased, thereby reactivating the amplifier 14. The device 11 has a source impedance of about 30 ohms; therefore, the loading effects of resistors 46 and 47 are not significant. While the diode $D_5$ is backbiased, its shunt capacitance of 1.50 picofarads is negligible compared to the normal input capacitance of the amplifier 14, which is about 10 picofarads.

When the first return signal is received following an acoustic transmission, such as the return signal 32 shown in waveform C of FIG. 3, it is amplified without inversion by the amplifier 14 and then coupled to the zero-crossover detector 18 by a capacitor 50. However, the output switch 16 is not triggered by a signal at the base of the transistor $Q_3$ from the zero-crossover detector 18 because it is disabled by the threshold detector 17.

The threshold detector 17 comprises a pair of NPN transistors $Q_6$ and $Q_7$ connected in a modified Schmitt-type circuit arrangement with the collector of the transistor $Q_6$ connected to the base of the transistor $Q_7$ by a resistor 51 having a capacitor 52 in parallel, and the collector of the transistor $Q_7$ connected to the base of the transistor $Q_6$ by an unbypassed resistor 53. The transistor $Q_6$ is normally cut off so that the transistor $Q_7$ is normally conducting at saturation. The anode of a Zener diode $D_6$ is then at substantially zero volts, while the cathode thereof is connected to a regulated +10 volts from the voltage regulator 22 via resistors 54 and 55. Accordingly, the Zener diode $D_6$ provides a regulated +6.2 volts between the resistor 55 and the anode of a diode $D_7$. In that manner, transistor $Q_8$ is normally biased on. When the first reflected signal exceeds the threshold level 30 (FIG. 2), transistor $Q_6$ is turned on, and the transistor $Q_7$ would normally be turned off to turn off the transistor $Q_8$ in the zero-crossover detector 18, thereby enabling it. However, during the period of the first reflected signal, the transistor $Q_2$ of the internal timing means is cut off to provide a positive signal (as shown in waveform D of FIG. 3) to the base of the transistor $Q_7$ through a resistor 56, thereby holding the transistor $Q_7$ conducting at saturation to continue to provide +6.2 volts between the diode $D_7$ and resistor 55. In that manner, the internal timing means 15 inhibits the operation of the threshold detector 17. That in turn disables the zero-crossover detector 18 by holding the shunting transistor $Q_8$ on. During the second half of the basic period for the internal timing means 15, the transistor $Q_2$ is conducting at saturation so that its collector is at substantially zero volts. Under those conditions, the resistor 56 functions as a bias resistor for the normal operation of the threshold detector 17.

During the second half of the normal period of the internal timing means 15, the threshold detector 17 operates in the normal manner to detect the second half of the first full cycle of the second return signal. The transistor $Q_6$ is then turned on, and the transistor $Q_7$ is thereby turned off to raise the potential at the anode of the Zener diode $D_6$ to the regulated voltage level also applied to the emitter of the transistor $Q_8$. Accordingly, the resistors 54 and 55 are then connected in series with the diode $D_6$ and resistor 57. With both ends of that series network connected to the same source of regulated voltage (+Vcc), the transistor $Q_8$ is cut off to allow the zero-crossover detector 18 to detect when the signal coupled thereto by the capacitor 50 crosses over the zero reference level from the positive second half of the first cycle of the reflected signal to the negative first half of the next full cycle. Upon detecting that zero-crossover, the detector 18 momentarily turns the transistor $Q_3$ on with a negative pulse at its base. The RC coupling network comprising the resistor 58 and capacitor 59 connects the base of the transistor $Q_5$ to the collector of the transistor $Q_3$. Accordingly, when the PNP transistor $Q_3$ is turned on, the NPN transistor $Q_5$ is also turned on, thereby effectively producing at the collector of the transistor $Q_5$ negative pulse 60 shown in the waveform B of FIG. 3. In that manner, the device 11 is triggered for the retransmission of the acoustic signal as shown by the waveform C of FIG. 3.

At the same time the piezoelectric device 11 is triggered for retransmission of the acoustic signal, the output switch 16 transmits a positive pulse through a resistor 61 and over the line 19 to reset the astable multivibrator (i.e., recycle the timing means 15). A buffer diode $D_8$ connects the line 19 to the base of the NPN transistor $Q_1$. The transistor $Q_1$ then turns off the transistor $Q_2$ to provide a positive signal to the base of the transistor $Q_7$ via resistor 56 to turn it on and thereby turn the transistor $Q_8$ on. At time $t_1$, the collector of the transistor $Q_2$ becomes positive as shown in the waveform D of FIG. 3 to once again disable the zero-crossover detector 18 via the threshold detector 17. In that manner, a new cycle is initiated for the internal timing means 15 about 40 microseconds before the end of its normal period of 200 microseconds represented by dotted lines in the waveforms A and D of FIG. 3. To expedite turning on the transistor $Q_8$ upon the device 11 being triggered for retransmission of an acoustic signal, the diode $D_7$ is connected to the collector of the transistor $Q_1$ for forward conduction when the transistor $Q_1$ is conducting. In that manner, the transistor $Q_8$ is turned on via the diode $D_7$ when the astable multivibrator of the internal timing means 15 is reset. Otherwise, turning on the transistor $Q_8$ would have to await the resetting of the threshold detector 17. Once the threshold detector 17 is reset, the transistor $Q_8$ is held on by the conducting transistor $Q_7$ and the Zener diode $D_6$. When the astable multivibrator of the internal timing means 15 again changes state to remove the positive inhibiting signal from the resistor 56, the diode $D_7$ becomes reverse-biased, but the zero-crossover detector 18 remains disabled due to the conduction of the transistor $Q_7$ until the second half of the first cycle of the next second return acoustic signal is detected. It should be noted that when the transistor $Q_7$ is turned on upon detection of the level 30 (FIG. 2), it remains turned on even though the input signal goes below the level 30 before the following zero-crossover due to the inherent hysteresis and delay in the operation of the Schmitt-type circuit.

Figure 4:
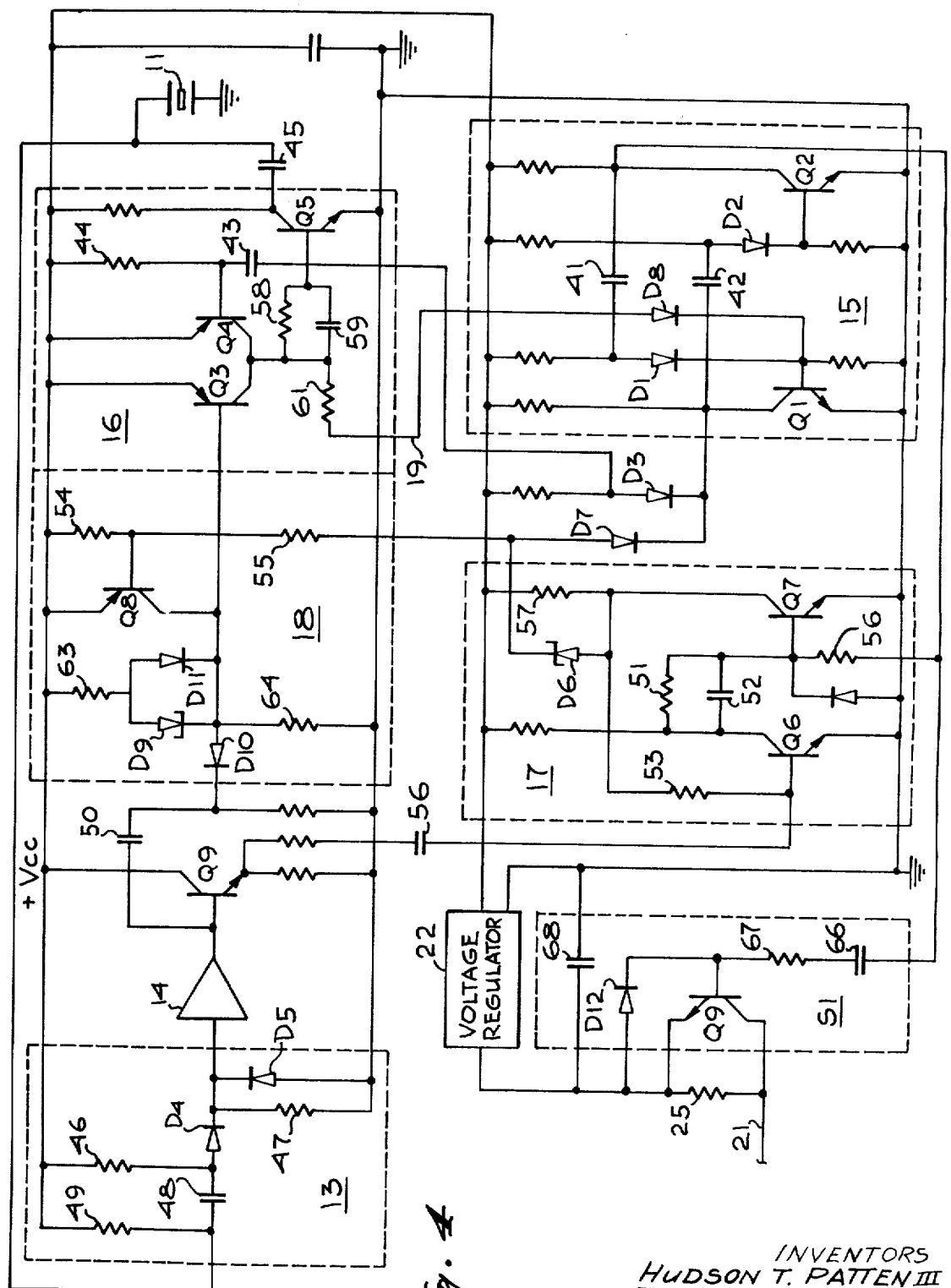
FIG. 4 is a schematic diagram of a preferred embodiment of the present invention.

As noted hereinbefore, the circuits illustrated in FIG. 4 for implementing the system of FIG. 1 may be conventional in the internal timing means 15, output switch 16, threshold detector 17, and crossover detector 18. However, operation of the zero-crossover detector may be improved by the use of a tunnel diode $D_9$ (preferably a gallium-arsenide device) biased by resistors 63 and 64 for conduction just below its peak current $I_p$. When a small amount of current slightly greater than the difference between the bias current and the peak current ($I_p - I_{bias}$) is provided through a diode $D_{10}$ coupling the diode $D_9$ to the capacitor 50, the operating point of the tunnel diode $D_9$ will quickly switch to a stable operating point in the negative resistance region of its characteristic curve. Diode $D_{10}$ is a metal silicon diode with a turnoff time much less than the switching time of the tunnel diode $D_9$; this diode $D_{10}$ prevents loading down the tunnel diode by the driving signal source. The transistor $Q_3$ is thereby switched on very fast due to the negative-going step of current provided by the tunnel diode $D_9$ upon its being switched from its low resistance state to its high resistance state when its very stable peak current is exceeded at zero-crossover. This configuration has three immediate advantages; zero-crossover detection is less temperature-sensitive due to inherent characteristics of the tunnel diode $D_9$; the input current gain is high since only a small current slightly greater than $I_p - I_{bias}$ is required to switch the tunnel diode; and the base current of the transistor $Q_3$ is essentially independent of the input signal drive level. A diode $D_{11}$ is connected in parallel with the tunnel diode $D_9$ to limit the forward voltage drop of the tunnel diode $D_9$ to approximately 0.6 volts. This prevents destructive degradation of the gallium-arsenide tunnel diode, a phenomenon that occurs when the tunnel diode is excessively forward-biased to more than about one volt.

As noted hereinbefore, the switch $S_1$ is connected in parallel with the resistor 25, as shown in FIG. 1, to shunt the resistor 15 in response to the output signal of the internal timing means 15. In that manner, the frequency or period of the internal timing means 15 may be monitored at the output terminal 23 through the power supply cable 21. To accomplish that, the inhibit signal applied to the resistor 56 in the threshold detector 17 from the collector to the transistor $Q_2$ is also coupled to the base of an NPN transistor $Q_9$ by a capacitor 66 and a resistor 67. In that manner, the transistor $Q_9$ is turned on by the positive transitions of the waveform D of FIG. 3, which is at each time the astable multivibrator of the internal timing means 15 is reset. When the transistor $Q_9$ conducts, the voltage on the line 21 is decreased. This is so because a capacitor 68 holds the emitter at a fixed potential while the base of the transistor $Q_9$ is driven positive. A diode $D_{12}$ is connected in parallel with the base-emitter junction of the transistor $Q_9$ to protect it from excess negative excursions of the signal coupled by the capacitor 66. The result is that the transistor $Q_9$ is periodically turned on to shunt the resistor 25 and decrease the voltage on the line 21 from some level, such as 20 volts, to a lower level such as 15 volts. The voltage regulator 22 filters that change in voltage produced on the line 21 and provides a highly regulated voltage for the circuits of the system at, for example, +10 volts. The periodic drop in voltage on the cable 21 may then be monitored, such as by an oscilloscope, to determine the speed of sound.

From the foregoing, it should be appreciated that improved apparatus and method for measuring the speed of sound in water and other liquids is provided by an arrangement which employs double reflection of an acoustic signal from a target and which triggers a transducer for retransmission of the acoustic signal on the zero-crossover point after the first full cycle of the reflected signal. A tunnel diode circuit is employed for zero-crossover detection, but it should be appreciated that in its broadest aspects the present invention is not limited to the use of a tunnel diode for that function. It should also be appreciated that the invention is in no sense dependent upon other novel features, such as an arrangement for using the power cable for monitoring the instrument. Accordingly, while the principles of the invention have now been made clear in an illustrative embodiment, there will be immediately obvious to those skilled in the art many modifications used in the practice of the invention without departing from these principles.

The embodiments of the invention in which an exclusive property or privilege is claimed are defined as follows:

1. In a system for monitoring measurements made at a remote location from the monitoring location, the combination of:

measuring means at said remote location, said measuring means having an electrical signal output whose repetition rate varies as a function of a physical input, a power cable extending between said monitoring location and said remote location, an electrical power source at said monitoring location for providing electrical power for said measuring means, a first resistance means at said monitoring location connected between said electrical power source and said cable, a second resistance means at said remote location having one end connected to said power cable, a switch means connected in parallel with said second resistance means and coupled to said electrical signal output for shunting said second resistance means at a rate in accordance with the repetition rate of said electrical signal output, a voltage regulator at said remote location having its input connected to the other end of said second resistance means and its output connected to said measuring means for providing a stabilized voltage output for said measuring means, and means coupled to the other end of said second resistance means for holding said other end at a substantially fixed potential in the presence of the shunting provided by said switch means, the resulting output voltage signal at the junction between said power cable and said second resistance means thereby having a repetition rate which varies in accordance with the rate of shunting of said second resistance means by said switch means, said resulting output voltage signal propagating to said monitoring location via said power cable to thereby permit monitoring at said monitoring location of the measurements made by said measuring means by monitoring rate variations of said resulting output voltage signal.

2. The invention in accordance with claim 1, wherein said power cable comprises a single coaxial cable.

3. The invention in accordance with claim 1, wherein said measuring means includes a cyclically operating internal timing means for providing said electrical signal.

* * * * *